(12) United States Patent
Dietrich

(10) Patent No.: US 6,619,162 B1
(45) Date of Patent: Sep. 16, 2003

(54) DEVICE FOR CUTTING TUBES

(75) Inventor: Karl Dietrich, Rain am Lech (DE)

(73) Assignee: Drossbach GmbH & Co. KG, Rain am Lech (DE)

(*) Notice: Subject to any disclaimer, the term of this patent is extended or adjusted under 35 U.S.C. 154(b) by 125 days.

(21) Appl. No.: 09/664,327

(22) Filed: Sep. 18, 2000

(30) Foreign Application Priority Data

Sep. 17, 1999 (DE) .......................... 199 44 696

(51) Int. Cl.[7] .............................. B23B 5/14; B23B 7/00
(52) U.S. Cl. .............................. 82/46; 82/48; 82/118
(58) Field of Search .......................... 82/46, 117, 118, 82/120, 121, 132, 133, 134, 137, 138, 159, 161

(56) References Cited

U.S. PATENT DOCUMENTS

| | | | | |
|---|---|---|---|---|
| 2,547,375 A | | 4/1951 | Chernack | 164/61 |
| 4,362,187 A | * | 12/1982 | Harris et al. | 138/109 |
| 5,074,018 A | | 12/1991 | Binggeli et al. | 29/413 |
| 5,239,901 A | * | 8/1993 | Lin | 82/119 |
| 5,265,505 A | * | 11/1993 | Frechette | 82/159 |
| 6,109,151 A | * | 8/2000 | Braun et al. | 82/48 |

FOREIGN PATENT DOCUMENTS

EP          0 826 467       3/1998

* cited by examiner

*Primary Examiner*—Henry Tsai
(74) *Attorney, Agent, or Firm*—Jacobson Holman PLLC

(57) ABSTRACT

Specific lengths of tube sections have to be severed from a run of spiral seam tubes being produced, in order to facilitate handling and storage. A cutter, with which sections of tubes can be severed cleanly without the formation of burrs from the run of tubes, comprises a carriage that can be slid back and forth on guides at right angle to the axis of the tube and on which carriage are mounted in the cut plane a milling cutter and shears, both of which can be moved on the tube independently of each other and back again with controlled drives.

13 Claims, 5 Drawing Sheets

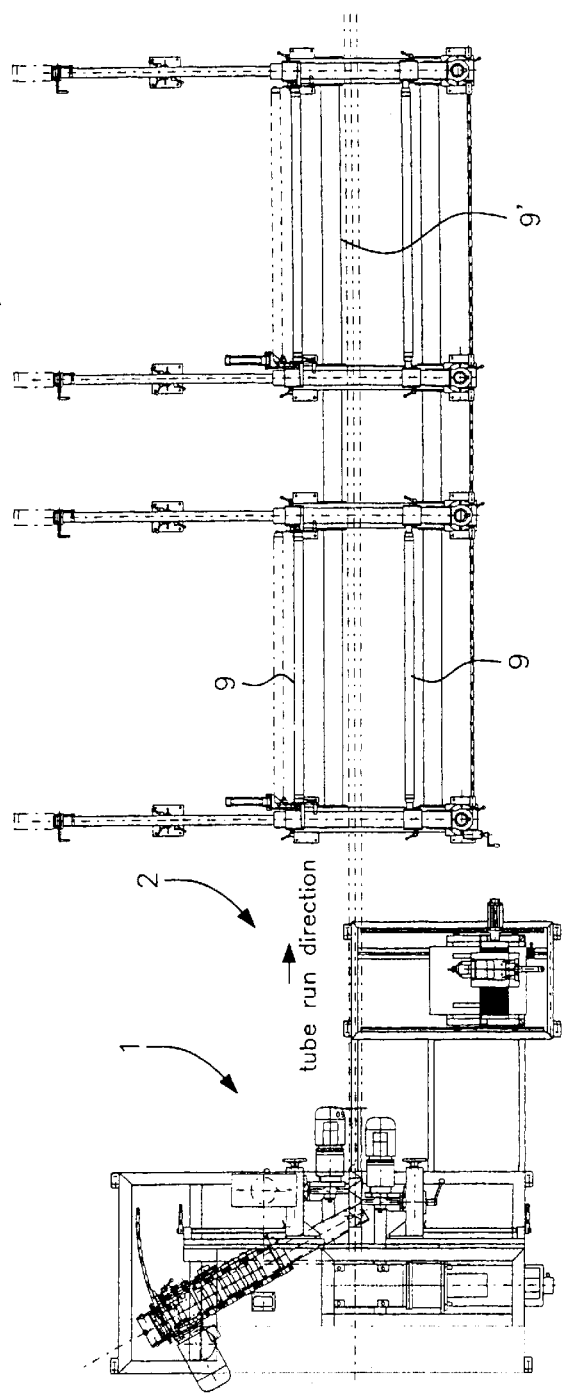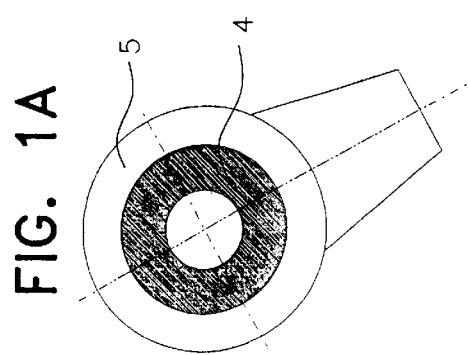

DEVICE FOR CUTTING TUBES

BACKGROUND OF THE INVENTION

1. Field of the Invention

The invention relates to a device for cutting tubes, which rotate around their axis, preferably for severing sections of spiral seam tubes from a run of tubes in production.

2. Description of the Related Art

Spiral seam tubes are produced with spiral seam tube machines from metal strips, which are unwound from coilers, holding metal rolls. In the production of said spiral seam tubes, the metal strip, which can be made, for example, of bright finished steel sheet, galvanized steel sheet, aluminum or inox, is profiled in a roller frame. The profiled metal strip is then laid around a rotating sleeve; and the bead, which is formed by profiling, and the affixed seam merge and are folded over by pressure rollers and completely sealed into a seam. Then the tube, made thus on the sleeve, is slid off the sleeve using push-off rollers. Then with the use of a cutting device of the class, described above, the sections are severed from the tube, which is produced in a well-known spiral seam tube machine and which comprises the helically wound metal strips, whose edges are connected together by means of a seam.

The severed sections of tube are then dumped and carried away.

It is universally known that sections of tubes are severed from a spiral seam tube, which is being produced, with a cutting disk that follows along, but it is also known that the cutting disk cuts poorly. Owing to its high speed, the cutting disk produces such high friction that the tube material heats up to the point that it becomes plastic. The result is lubrication and burrs, which must be removed in a special working step. Furthermore, the heat, generated by the cutting disk, also damages the layer of zinc, a feature that is quite undesirable.

SUMMARY OF THE INVENTION

Therefore, the object of the invention is to provide a device of the aforementioned type, with which sections of tube can be severed cleanly from a tube without the formation of burrs. At the same time the severing procedure should not generate any heat that could impair the tube coatings.

The invention solves this problem with a carriage that can be slid back and forth on guides at right angle to the axis of the tube. Said carriage exhibits in the cut plane a milling cutter and shears, both of which can be moved on the tube independently of each other and back again with controlled drives.

In the inventive device the milling cutter makes the notch in the tube's diameter plane. Then the shears penetrate said notch and execute the round cut, once the milling cutter has been withdrawn.

The milling cutter is preferably a pin-type milling cutter, which can execute in an ideal manner the notch.

The shears are preferably two fork-shaped jaws, which can be positioned at the tube jacket and between which dives a cutting tongue that penetrates the tube jacket. The cutting tongue cuts a strip, equivalent to its width, from the tube jacket. Said strip is wound into a roll during the cutting process; and once the cut is completed, the roll falls off and is fed into a waste basket.

The unit, holding the milling cutter and the shears with their on- and off-devices, is mounted on a carriage, which can be slid parallel to the axis of the tube. This carriage, which is guided at right angle to the moveable carriage, travels along with the tube at its rate of feed so that a clean cut can be executed in the diameter plane.

The unit, holding the milling cutter and the shears with their on- and off-devices, can also be mounted on a carriage, which can be moved at right angle to the axis of the tube and which in turn guided on a carriage, which can be moved parallel to the axis of the tube.

Another embodiment of the invention provides a control, which employs the milling cutter in front of the shears in such a manner that the milling cutter severs the seam and then the control inserts the shears into the cut slot. The shears sever the seam-free peripheral portion of the tube jacket, after the milling cutter has been withdrawn. The seam exhibits four layers of strip material, which the shears normally cannot sever. For this reason the milling cutter, making the notch, is inserted in front of the seam so that the milling cutter severs the seam and the shears have only to cut the unilayered jacket material of the tube.

The control moves the carriage, which can be slid parallel to the tube, at the speed of the tube.

A preferred embodiment provides that the tube stands still while the milling cutter penetrates the tube jacket or rotates only at a decreased rate of production and moves in the axial direction. In this manner good penetration and a good notch are guaranteed. The rate of production is increased again expediently after the milling cutter has penetrated the tube jacket.

In another embodiment of the invention, the rate of production is further increased during the cutting process with the shears, as compared to the rate during the cutting process with the milling cutter. The rate of production during the cutting process with the shears is expediently still below the rate of production between the cutting processes.

Preferably the control of the cutter comprises a computer, for example, an SPS [=series parallel series] control. An especially preferred embodiment provides that the control controls the use of the milling cutter and the shears and the speed of the carriage, carrying the milling cutter and the shears, as a function of the speed of the metal strip, flowing into the spiral seam tube machine. The number of revolutions of the tube and the speed of the tube in the axial direction can be computed from the metal strip's rate of feed so that these values, computed by the computer, can be used to control the milling cutter and the shears, as well as the carriage, carrying them.

One embodiment of the invention is explained in detail in the following with reference to the drawings.

BRIEF DESCRIPTION OF THE DRAWINGS

FIG. 1 is a top view of the spiral seam tube system, comprising a spiral seam tube machine, a cutter and a tube pay-off frame.

FIG. 1A is a schematic of a strip roller and coiler for feeding a metal strip to the spiral seam tube machine of FIG. 1.

DETAILED DESCRIPTION OF THE PREFERRED EMBODIMENTS

Figure 2:
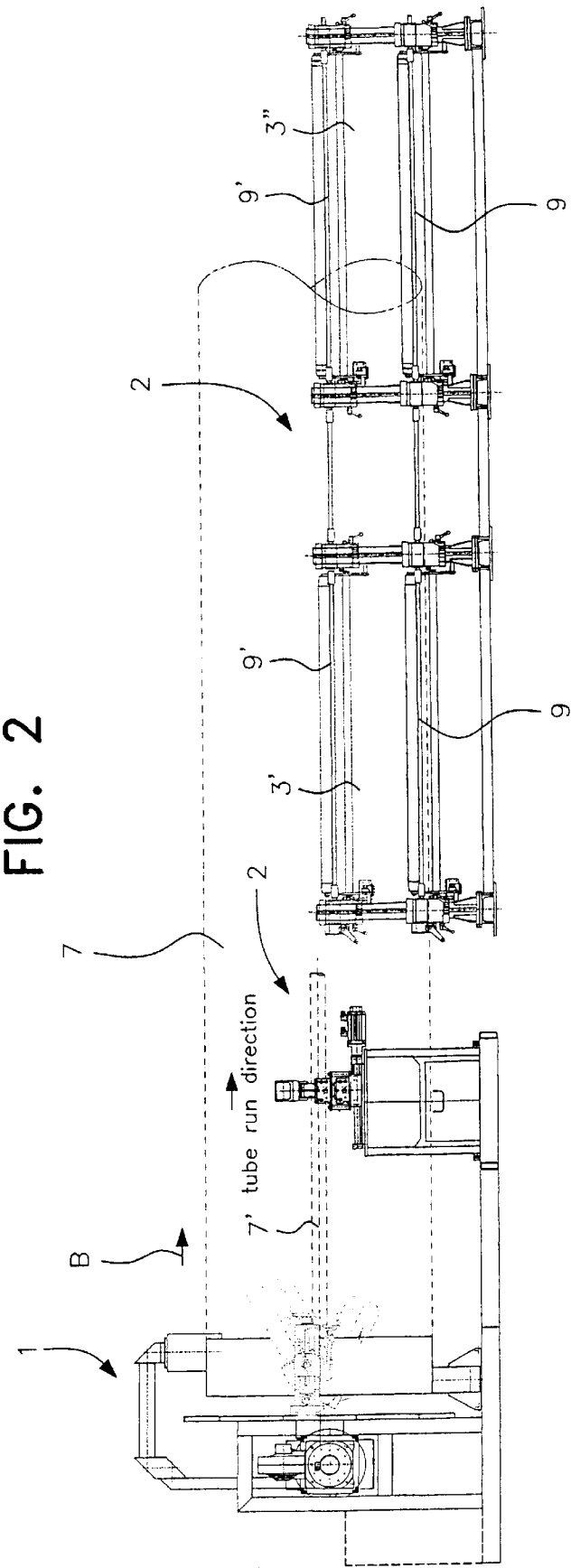
FIG. 2 is a side view of the system, according to FIG. 1.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

As shown in FIG. 1, the spiral seam tube system comprises a spiral seam tube machine 1, a cutter 2 and a tube payoff frame 3. Both cutter and pay-off frame follow the spiral seam tube machine. The metal strip, processed in the spiral seam tube machine, is unwound from a strip roller 4, which is stored in a coiler 5, depicted as a schematic drawing in FIG. 1A. The unwound metal strip is profiled in a roller frame 6, and in particular in such a manner that one edge is raised and the other edge is provided with a bead. Then both are laid in such a manner around a rotating sleeve that the bead extends beyond the raised edge and then both can be folded into a seam using pressure rollers. The seam connects the spiralled metal strip to a tube. The spiral seam tube machine exhibits a conventional construction and is, therefore, not explained in detail here.

Figure 3:
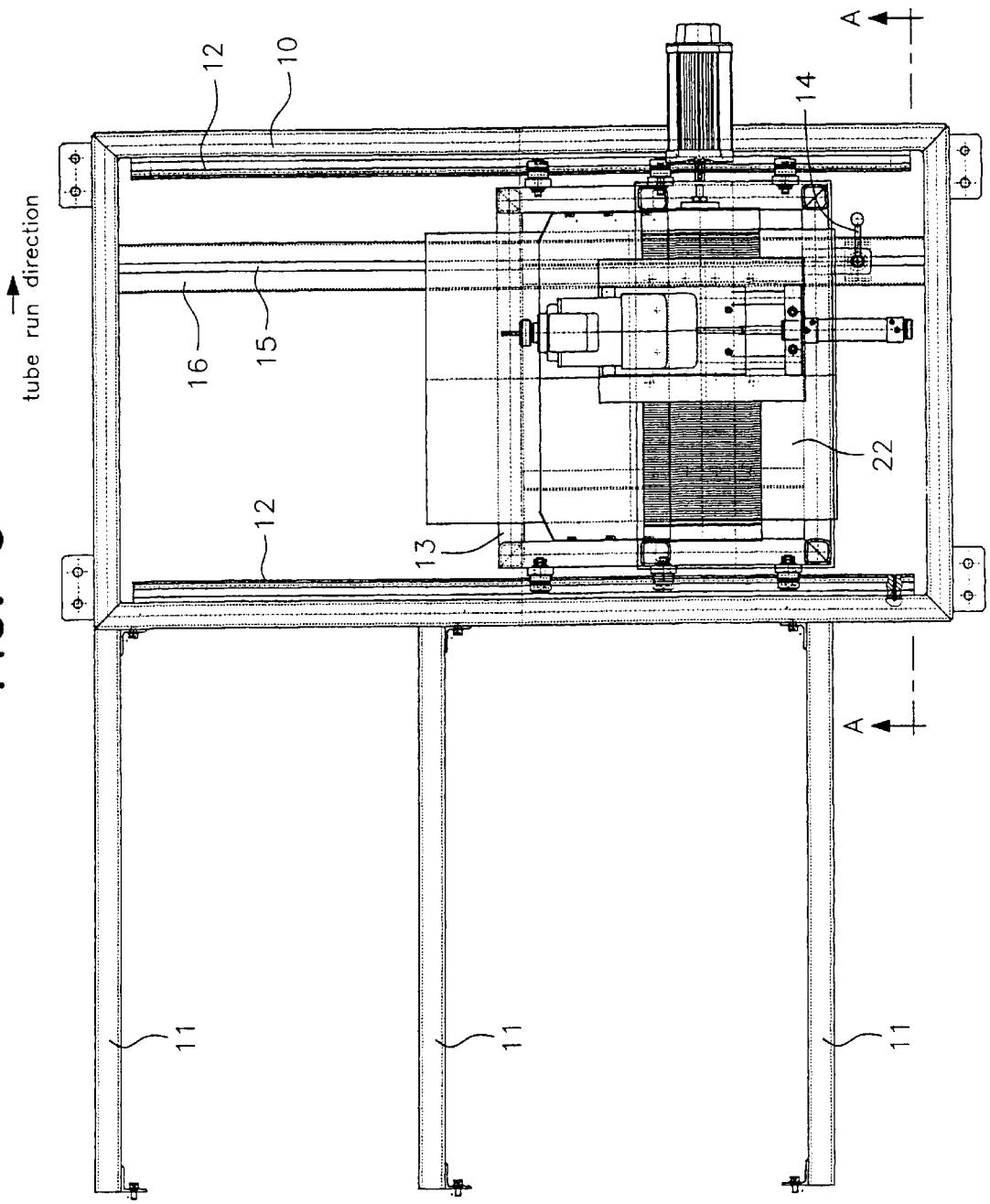
FIG. 3 is an enlarged top view of the cutter.
Figure 4:
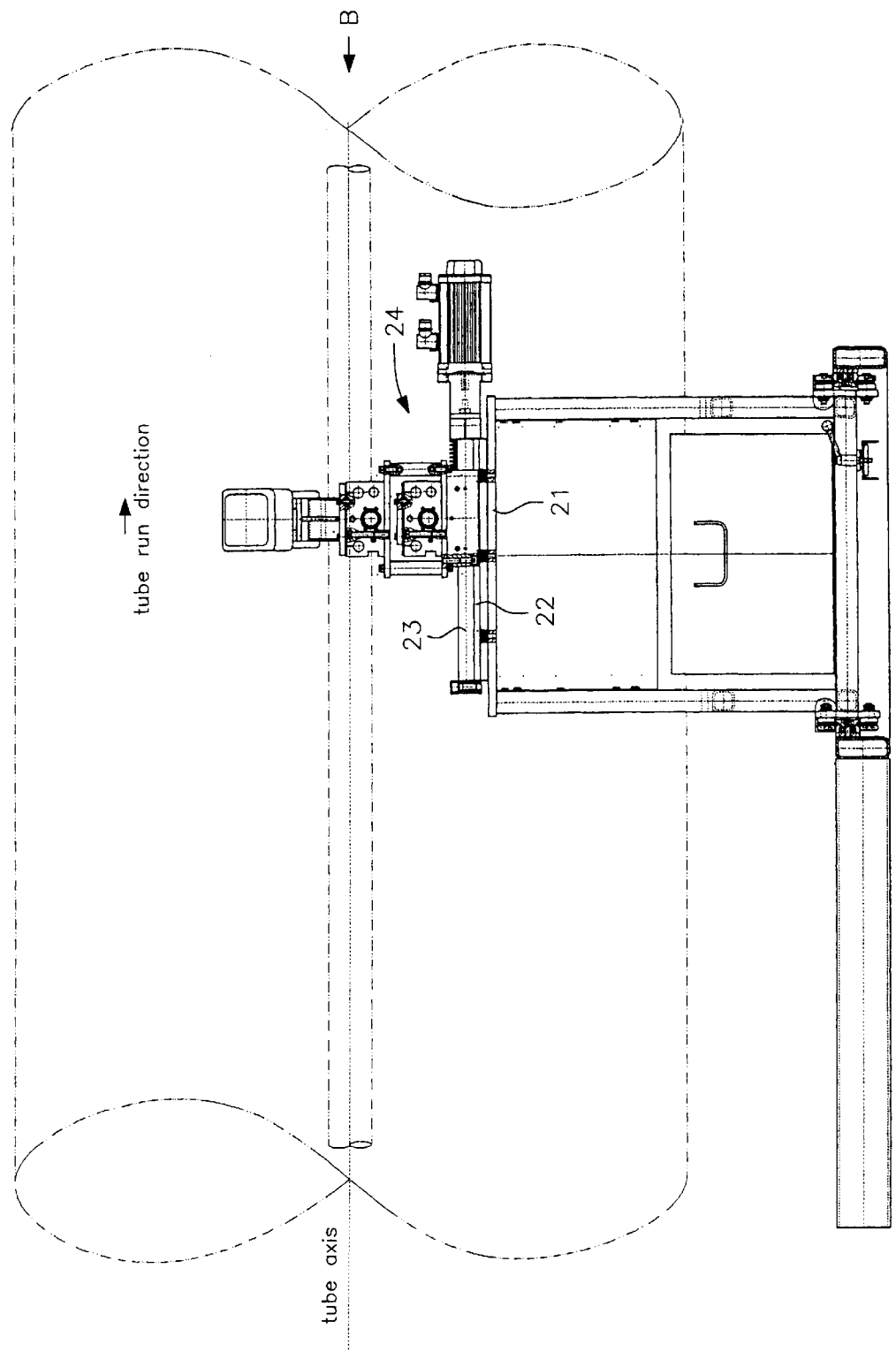
FIG. 4 is a sectional view of the cutter along the line A—A in FIG. 3.

The spiral seam tube 7, which is produced in the spiral seam tube machine 1 and which is depicted in FIG. 2 with two diameters 7, 7', travels out of said machine in the direction of production B and, in so doing, travels by the cutter 2. The spiral seam tube 7, 7', passing the cutter 2, travels into the pay-off frame 3, which comprises two parts 3', 3 ". The parts 3', 3 " are coupled together in such a manner that they can accommodate, for example, tube sections of up to 6 m. The units, carrying the tube or sections of tubes, can also be adjusted in the manner illustrated to the smallest tube diameter 9', as indicated by the dashed line. The tube sections, severed by the cutter, are then carried At this point the cutter 2 will be described in detail with reference to FIGS. 3 to 5. The cutter 2 comprises a basic frame 10, which is connected to the frame of the spiral seam tube machine by means of the carrier 11. On the basic frame 10 are mounted the rails 12, which run parallel to each other along the side uprights and on which a wagon 13 can be slid with rollers so that the wagon can be adjusted to different diameters of the sprial seam tubes that are produced. The wagon 13 is fixed in the adjusted position by means of a hand lever 14, by means of which a shim, guided in a tapered groove 15 of a carrier 16, connected to the cross bars of the frame, is clamped to the carrier 16.

The wagon 13 carries a table-like frame 20, on whose table plate 21 are mounted guides, which run parallel to the rails 12 and on which a carriage 22 can be slid back and forth.

The carriage 22 is provided with guides 23, which run at right angles to the rails 12. A slide unit 24 can be slid on the guides 23. The slide unit can be slid at the respective rate of production parallel to the axis of the tubes 7, 7' by means of a synchronous motor and a gear parallel to the tube that is produced. On the slide unit 24 there is, on the one hand, a milling cutter 26, which can be a shank-type milling cutter, with related drive motor 27 and gear unit; and, on the other hand, there are the shears 28.

The milling cutter 26 is driven by a three phase motor 27, which can exhibit speeds of up to 25,000 rpm.

The shears 28 are conventional shears with two fork-shaped jaws 30, which can be positioned at the tube jacket 29 and between which dives a cutting tongue 31, which penetrates the tube jacket 29 and which is driven so as to swing back and forth at a high frequency.

The milling cutter 26 and motor 27 are connected to a sleeve 33 by means of a carrying piece 32. The shears 28 are connected to the sleeve 35 by means of a holder 34. The sleeves 33, 35 can be moved independently of each other on linear guides 36, 37 in the direction of the tube 7, 7' by means of drive units. The sleeves can also be retracted from the tube.

Figure 5:
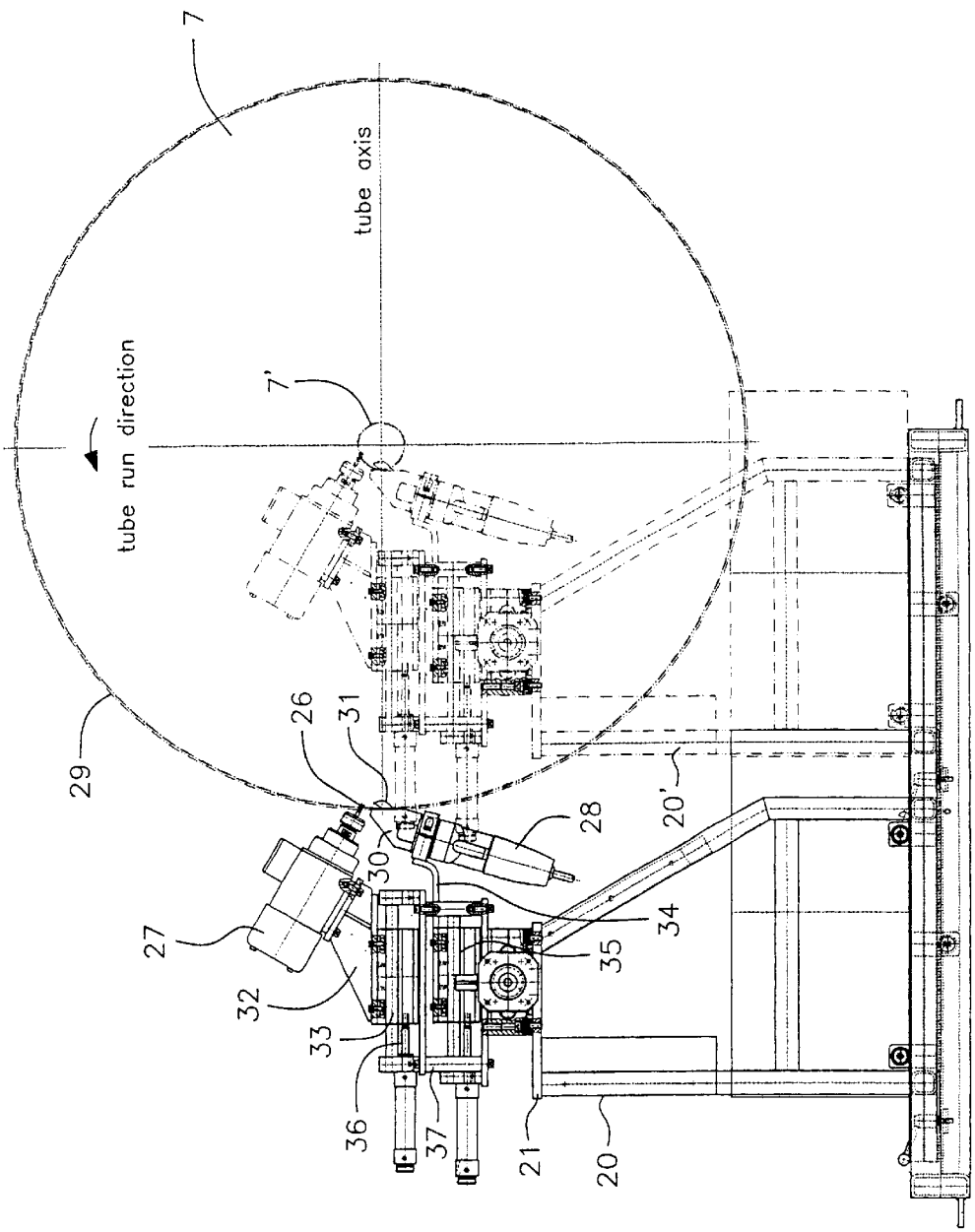
FIG. 5 is a view of the cutter in the direction of arrow B in FIG. 4.

As evident from FIG. 5, the milling cutter 26 and the shears 28 can be adjusted from the largest diameter of the tube 7 to the smallest diameter of the tube 7' by moving the table-like frame 20.

The cutter is controlled by means of a processor, which derives the control data from the metal strip's rate of feed, which is controlled in accordance with the respective optimal cutting rate of the milling cutter and the shears.

The tube sections are severed from the run of tubes being produced, according to the following basic steps.

At the start of the cut, the rate of production is reduced to 0, or at a minimum to a drastically reduced rate of production.

Then the heavy duty milling cutter 26 is advanced toward the tube so that said cutter penetrates the tube jacket. In so doing, a notch is produced just in front of the seam.

Then tube production starts up again so that the tube is rotated and advanced at a slow rate. The milling cutter 26 travels along in the axial direction at the tube rate and cuts into the tube jacket a circumferential slot, which also severs the seam. The carriage, carrying the milling cutter and the shears, moves synchronously in the axial direction along with the tube.

Then the shears are turned on and move in such a manner into the slot, precut by the milling cutter, that the tongue 31 penetrates the tube jacket; and the jaws 30 rest from the outside on the tube jacket.

The shears are centered by moving them into the slot.

The tube continues to travel at a slow rate. The milling unit moves back and the shears execute the cut over the remaining seam-free tube circumference at a raised tube speed and, thus, at the rate of production.

After one complete revolution of the tube, thus after severing the tube section, the tube remains standing owing to the interruption in production. Then the tube cutter moves at right angle to the axis of the tube and then back into its starting position in the axial direction.

The tube section, held on the pay-off frame, is dumped; and then the production of the spiral seam tube machine continues again.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for use with a spiral tube machine which severs sections of spiral seam tubes from a tube in production, said tube rotating around an axis and having a seam that extends substantially parallel with said axis in a tube wall, said device comprising:

a carriage provided with guides extending substantially parallel to said axis, said carriage moving substantially parallel to said tube at a carriage speed;

a slide unit mounted on said carriage and movable therewith, said slide unit having first and second sleeves moveable along linear guides independently of one another and perpendicular to said axis;

a first cutting device mounted on said first sleeve and movable toward said tube to a first cutting position and away from said tube to a first non-cutting position, said first cutting device in said first cutting position severing said seam and forming a cut slot extending through the tube wall;

a second cutting device mounted on said second sleeve and movable, independently of said first cutting device, toward said tube to a second cutting position and away from said tube to a second non-cutting position, said second cutting device in said second cutting position being inserted into said cut slot after said first cutting device has been moved away from said first cutting position, said second cutting device severing a seam-free peripheral portion of said tube wall around a circumference thereof; and a control device for controlling the first and second cutting devices and for controlling the carriage speed as a function of a feed rate of a metal strip flowing into said spiral tube machine.

2. The device according to claim 1, wherein said first cutting device is a milling cutter and said second cutting device is shears.

3. The device according to claim 1, wherein said second cutting device is shears having two fork-shaped jaws between which a cutting tongue extends to penetrate the tube wall.

4. The device according to claim 1, wherein said tube stands still while the first cutting device penetrates the tube wall.

5. The device according to claim 1, wherein said carriage speed is equal to a speed of the tube, said speed being slower during operation of said first cutting device than during operation of said second cutting device.

6. The device according to claim 2, wherein said carriage speed is equal to a speed of the tube, said speed being slower during operation of said milling cutter than during operation of said shears.

7. A device for use with a spiral tube machine which severs sections of spiral seam tubes from a tube in production, said tube rotating around an axis and having a seam in a tube wall that extends substantially parallel with said axis, said device comprising:

a carriage moving substantially parallel to said tube at a carriage speed;

a first cutting device mounted on said carriage for severing said seam and cutting a slot extending through the tube wall;

a second cutting device mounted on said carriage for insertion into said slot cut by said first cutting device and severing a seam-free peripheral portion of said tube wall around a circumference thereof; and a control device for controlling said first and second cutting devices and for controlling the carriage speed as a function of a feed rate of a metal strip flowing into said spiral tube machine.

8. The device according to claim 7, wherein said carriage has a slide unit mounted thereon and movable therewith, said slide unit having first and second sleeves moveable along linear guides independently of one another and perpendicular to said axis, said first cutting device mounted on said first sleeve and said second cutting device mounted on said second sleeve.

9. The device according to claim 7, wherein said first cutting device is a milling cutter and said second cutting device is shears.

10. The device according to claim 7, wherein said second cutting device is shears having two fork-shaped jaws between which a cutting tongue extends to penetrate the tube wall.

11. The device according to claim 7, wherein said tube stands still while the first cutting device penetrates the tube wall.

12. The device according to claim 7, wherein said carriage speed is equal to a speed of the tube, said speed being slower during operation of said first cutting device than during operation of said second cutting device.

13. The device according to claim 9, wherein said carriage speed is equal to a speed of the tube, said speed being slower during operation of said milling cutter than during operation of said shears.

\* \* \* \* \*